July 28, 1964  J. MULLER  3,142,281
VESSEL FOR CLEARING FLOATING LIQUIDS AND GARBAGE
FROM STRETCHES OF WATER OR SHIPS
Filed July 27, 1962  2 Sheets-Sheet 1
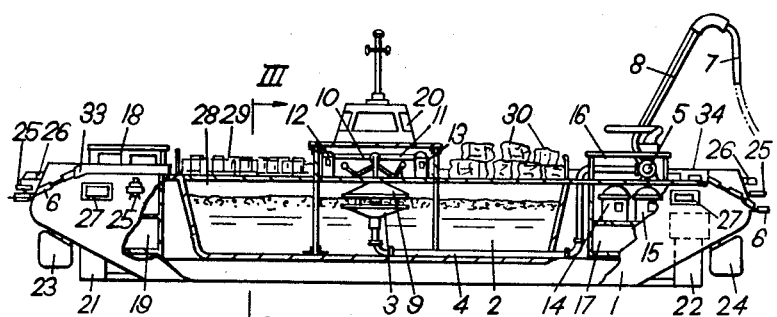
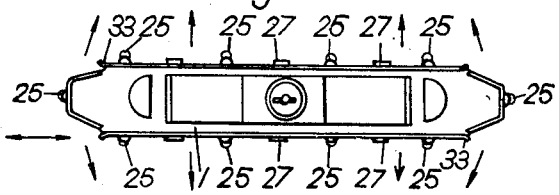
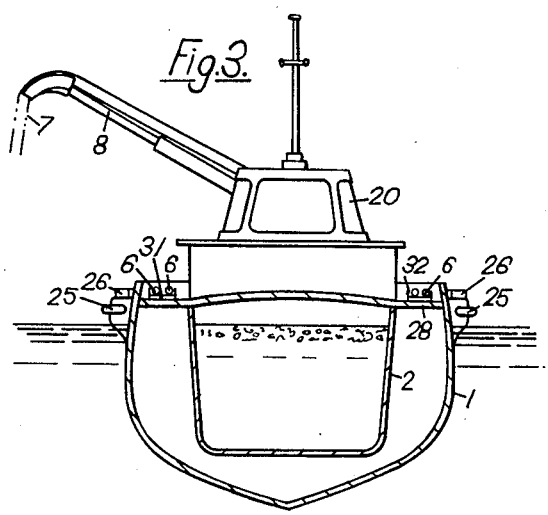
Inventor
JACQUES MULLER
By
Attorney

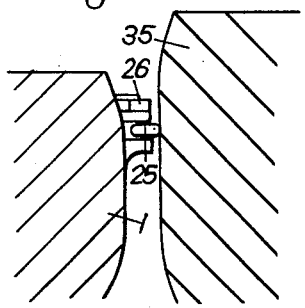
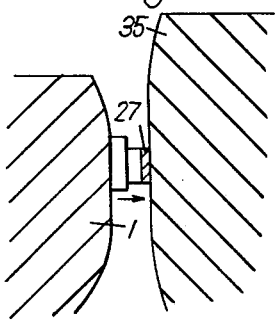
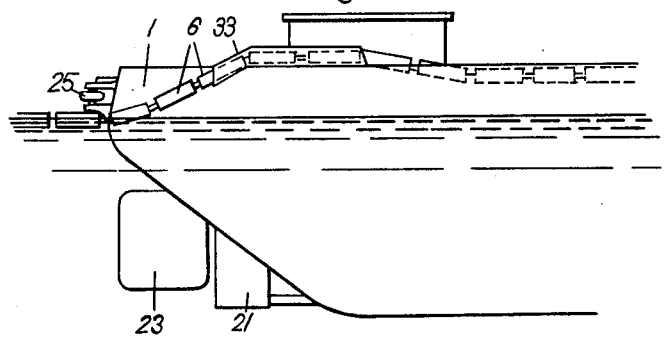

¹ United States Patent Office 3,142,281
Patented July 28, 1964

3,142,281
VESSEL FOR CLEARING FLOATING LIQUIDS AND GARBAGE FROM STRETCHES OF WATER OR SHIPS
Jacques Muller, La Garenne-Colombes, France, assignor to Rellumit Inter S.A.R.L., La Garenne-Colombes, France, a French corporation
Filed July 27, 1962, Ser. No. 212,866
Claims priority, application France Aug. 22, 1961
10 Claims. (Cl. 114—.5)

This invention relates generally to the problem of clearing floating layers of oil, solid garbage and other waste matter from the surface of the sea or from harbours, rivers or other expanses of water, and more particularly to a vessel which is exceptionally manoeuvreable and is equipped for the collection separation and storage of such waste matter.

Due to the ever-increasing world consumption of oil and oily products, and the transport of the oil and oily products by sea and river routes, a great deal of pollution occurs in the water-ways used for this purpose, due to leakages from pipe lines, accidental discharge or deliberate dumping of oil and oily products from ships, and through the washing out or other cleaning of oil tanks and gear within the ships. In consequence the surface of the water in the open sea or in harbours, rivers, etc., is often polluted by floating layers of oil and oily products which are not only harmful to aquatic flora and fauna but may also be very dangerous, due to their inflammable nature. In addition to the floating oil or oily products, unsightly collections of solid waste material and garbage, such as corks, straw, packages and pieces of wood, often collect at points where the water is relatively still. Such layers of oil and oily products and the waste material and garbage are dirty and malodorous and they may easily form breeding grounds for infection, insects etc. They also provide obstacles to navigation and are a great annoyance to swimmers and bathers and to anything which vegetates or lives in the water.

In the interests of safety and hygiene, and in order to preserve the natural beauty of expanses of water, as well as river banks and beaches, it is necessary to effect the removal of the said layers and collections of garbage and if this is properly carried out waste oil, for example, may be purified and recovered and become a commercially useful and valuable material.

It is known to use floating pipe lines provided with strainers or suckers which are arranged around a layer of waste oil etc., for drawing off the surface layer, together with the upper layer of water immediately beneath the surface layer, and conveying them to fixed or mobile separating and filtering apparatus which retains the oil and discharges the purified water.

One object of the invention is to provide a vessel which is specially equipped with means for collecting the layer of oil and other waste matter from the surface of expanses of water and treating this matter.

Another object is to provide a vessel for collecting and treating waste matter collected from the surfaces of expanses of water which is exceptionally manoeuvreable so that it may be used in restricted spaces.

A further object is to provide a vessel which is equipped with independent propulsion and steering means at both ends and which is also equipped with floating pipelines and ramps over which the pipelines may be payed out and hauled in to the ship.

Still another object is to provide a vessel for collecting waste matter which is equipped with fender wheels or horizontally movable endless tracks serving as fenders so that it may pass close to the hulls of ships without rubbing or scraping.

A still further object of the invention is to provide a vessel for treating liquid waste matter which is equipped with pipelines for collecting the waste matter, carried by cranes, to enable the pipelines to be lowered into ships, and which is also provided with electromagnetic anchoring means to enable the vessel to be anchored magnetically to the steel plates of a ship's hull.

Still further objects and advantages of the invention will become apparent from a reading of the following specification with reference to the accompanying drawings in which:

FIGURE 1 shows in partial vertical section a vessel according to the invention;

FIGURE 2 is a plan view of the vessel of FIGURE 1 on a smaller scale;

FIGURE 3 is a transverse vertical section of the vessel of FIGURE 1 on a larger scale, taken on the line III—III of FIGURE 1;

FIGURE 4 is a diagrammatic vertical section of a part of the vessel and a part of a ship showing the fender wheels in operation;

FIGURE 5 is a diagrammatic vertical section of a part of the vessel and a part of a ship showing the resiliently mounted electromagnetic anchoring device in operation; and FIGURE 6 shows one end of the vessel while paying out or hauling in a floating pipe line.

Referring to the drawings, and initially to FIGURE 1, a vessel according to the invention is in the form of a barge having a hull 1 in the centre of which is situated a tank 2 which is divided by vertical partitions into three sections. This tank is filled to a certain level with water polluted with oil or other waste matter drawn from the surface of an expanse of water such as a sea, a harbour, a river or a lake, or oily waste liquid drawn from the bilge space or tanks of a ship. The tank 2 also serves as a decanting tank. In the centre compartment of the tank 2 a diffuser 3 is provided which is connected to an inlet pipe 4 leading from a pump 5, which is connected to one or more floating pipelines 6 for collecting the polluted surface layer of water or to an overhead pipeline 7 held by the extending and swivelling jib 8 of a crane (FIGURES 1 and 3), which overhead pipeline may lead into a ship for collecting bilge or other polluted water, or water and oil in the tanks of an oil tanker, for example. Above the diffuser 3 a suction bell 9 is connected by pipes 10 and 11 to separating and filtering apparatus 12 and 13. Garbage disintegrators 14 and 15 are provided to separate and break up solid matter, such as pieces of wood, floating packages, corks and the like, from the water drawn into the ship, and presses (not shown) may conveniently be provided for compressing this solid matter into blocks or bales for later disposal. The diffuser 3 and the floating bell 9 may be in accordance with my co-pending United States Patent Application Serial No. 202,512.

More particularly as set forth in said copending application as the polluted water is forced by pump 5 through pipe 4 into diffuser 3, it will thereupon be expelled laterally from the diffuser into the bilge space or tanks. As a result of such lateral ejection of water, the lighter material such as floating wood, garbage and the like will float on the surface of the water in the bilge tanks and as the diffuser and suction bell 9 thereabove are floating in the water in the bilge tank, the suction bell 9 and diffuser will maintain a level such that the undersurface of the suction bell 9 rests on the surface of the liquid. More particularly, to provide such floating action, suitable floats are associated with the diffuser and the bell so that they may move vertically independently of each other and the floats may be adjusted so that the mouth of the diffuser is slightly below the level of the debris floating in the water and the mouth of the bell is on a level with the upper surface of such floating debris. The diffuser and the bell have sliding connections with the ends of pipe 4 and pipes 10 and 11 connected thereto to permit such independent vertical movement. By reason of the suction applied through line 10 to the bell 9, the surface layer of water together with floating debris will be drawn through pipes 10 and 11 into the disintegrators 14 and 15 which serve to separate the debris from the water and such debris can then be periodically removed from the disintegrators when the latter fill up and be compressed into blocks or bales as above described.

These blocks or bales can then be stored in the container 30 and where, instead of water which would be discharged back into the sea, for example, the equipment is used to separate debris from oil, the latter can be fed from the disintegrators into the drums 29.

As the construction and operation of the diffuser 3 and bell 9 are clearly described in said copending application it will not be further described.

Engine rooms or compartments 16, 17, 18 and 19 are provided to contain engines for propelling the vessel and for operating the separating and compressing machinery, and a general control cabin 20 is located at the centre of the vessel for manoeuvring the vessel and controlling the operation of its machinery. In addition, the vessel comprises the usual arrangements and equipment peculiar to ships, which are not shown.

To permit the vessel to be moved in all directions, as indictated by the arrows in FIGURE 2, it is provided with two independent rotary propulsion means 21 and 22 which are preferably of the "Voigt-Schneider" type and are arranged respectively at the two ends, in combination with two independent rudders 23 and 24.

On its outside the hull of the vessel is provided with a number of small pneumatic-tyred fender wheels 25 (FIGURES 2 and 4) arranged to run on substantially vertical axles and suitably spaced along the length of the hull. The axles on which these wheels are mounted may be fixed, or they may be provided with shock absorbing systems, and they may also be made retractable into the hull if desired. Each wheel is provided with a brake 26.

In place of the pneumatic-tyred fender wheels 25, rollers or an endless track system mounted on a series of wheels similarly placed to the wheels 25, may be provided, and these may be carried in a shock absorbing support system. By these means the vessel may gently draw alongside the hull of a ship and the wheels 25 or the track begin to move as soon as they touch the ship, so that there is no damage due to rubbing or scraping. Once the vessel is in position it is only necessary to apply the brakes to the wheels or the rollers or the track system to stop the vessel.

Between the pneumatic-tyred fender wheels 25 are electromagnets 27 (FIGURE 5) which are resiliently mounted and which are also provided with a system of spark arresting nozzles. The electromagnetic anchoring system 27 may be applied to the side of the ship 35 for anchoring the vessel to the ship, so that the transfer of polluted bilge water or matter from oil storage tanks etc., may be carried out.

The vessel is provided with a deck 28 (FIGURES 1 and 3) for storing drums 29 and containers 30 (FIGURE 1) which contain the recovered oily products and bales of compressed garbage. On either side of the deck are runways 31 and 32 (FIGURE 3) which accommodate floating pipelines 6. The vessel is also provided with ramps 33 and 34 at its two ends (FIGURES 1 and 6) which may be fixed or may be arranged for adjustable inclination, over which the flexible pipelines are payed out and hauled in.

I claim:
1. A vessel for collecting and recovering liquid and solid waste matter suspended in or floating upon the surfaces of expanses of water, in the form of a self-propelling barge containing a tank for receiving and decanting water polluted by the waste matter, a pump for drawing in and delivering said polluted water into said tank, a diffuser through which said polluted water is passed from said pump into said tank, and a suction bell immediately above said diffuser through which waste matter floating on the water in said tank is drawn off for separation and recovery of said waste matter.

2. A vessel as claimed in claim 1 comprising runways for storing floating pipelines and ramps over which said floating pipelines may be payed out and hauled in.

3. A vessel as claimed in claim 1 comprising independent propulsion and steering means at both ends of said vessel to facilitate manoeuvring in all directions.

4. A vessel as claimed in claim 1 comprising fender wheels disposed along the sides of said vessel to enable said vessel to pass closely alongside a ship without rubbing or scraping.

5. A vessel as claimed in claim 4 comprising brakes on said fender wheels.

6. A vessel as claimed in claim 1 comprising horizontally movable endless tracks disposed along the sides of said vessel to enable said vessel to pass close to the hulls of ships without scraping or rubbing.

7. A vessel as claimed in claim 6 comprising brakes on said tracks.

8. A vessel as claimed in claim 1 comprising electromagnetic anchor means whereby said vessel may anchor itself magnetically to the steel hulls of ships.

9. A vessel for collecting and recovering liquid and solid waste matter in the form of a barge having independent propulsion and steering means at both ends thereof, a tank for receiving and decanting water polluted by said waste matter, a pump for drawing in said polluted water and delivering it into said tank, a diffuser through which said polluted water is passed from said pump into said tank, a suction bell immediately above said diffuser through which matter floating on the water in said tank is drawn off for separation, electromagnetic anchoring means disposed along the sides of said vessel whereby it may anchor itself magnetically to the steel hull of a ship, and at least one crane and a pipeline supported thereby, said pipeline being passed into said ship for collecting said waste matter.

10. A vessel as claimed in claim 9 comprising movable fender means disposed along the sides of said vessel, whereby it may move closely alongside the hull of a ship without scraping or rubbing.

References Cited in the file of this patent

UNITED STATES PATENTS

| | | |
|---|---|---|
| 872,356 | Lemp | Dec. 3, 1907 |
| 1,303,959 | Powlin | May 20, 1919 |
| 2,761,410 | Marr | Sept. 4, 1956 |
| 2,837,049 | Franz | June 3, 1958 |
| 2,875,546 | Weathersby | Mar. 3, 1959 |
| 2,908,393 | Lamphier | Oct. 13, 1959 |
| 2,939,416 | Calabrese | June 7, 1960 |
| 2,989,185 | Lombardi | June 20, 1961 |

FOREIGN PATENTS

| | | |
|---|---|---|
| 742,347 | Great Britain | Dec. 21, 1955 |